United States Patent [19]
Zee et al.

[11] Patent Number: 5,557,015
[45] Date of Patent: Sep. 17, 1996

[54] METHOD OF PREPARING HYDRAZINE NITROFORM

[75] Inventors: Fransiscus W. M. Zee, Bodegraven; Johannes M. Mul, Haarlem; Arie C. Hordijk, Maassluis, all of Netherlands

[73] Assignee: Aerospace Propulsion Products B.V., Netherlands

[21] Appl. No.: 424,412

[22] PCT Filed: Nov. 3, 1993

[86] PCT No.: PCT/NL93/00230

§ 371 Date: May 30, 1995

§ 102(e) Date: May 30, 1995

[87] PCT Pub. No.: WO94/10104

PCT Pub. Date: May 11, 1994

[30] Foreign Application Priority Data

Nov. 3, 1992 [NL] Netherlands ............................ 9201916

[51] Int. Cl.$^6$ ................................................ C07C 241/02
[52] U.S. Cl. ........................... 564/464; 568/924; 568/944
[58] Field of Search ............................ 564/464; 568/924, 568/944

[56] References Cited

U.S. PATENT DOCUMENTS

| | | | |
|---|---|---|---|
| 2,963,507 | 12/1960 | Rudner et al. | 564/464 |
| 3,140,317 | 7/1964 | Groves | 568/926 |
| 3,213,609 | 10/1965 | Johnston et al. | 60/217 |
| 3,297,747 | 1/1967 | Thornton | 564/310 |
| 3,378,594 | 4/1968 | Lovett | 568/944 |
| 3,378,595 | 4/1968 | Brown et al. | 568/925 |
| 3,384,674 | 5/1968 | Brown et al. | 568/925 |
| 3,384,675 | 5/1968 | Brown | 568/925 |
| 4,418,183 | 12/1968 | Rice | 149/6 |

FOREIGN PATENT DOCUMENTS 896450  4/1960  United Kingdom .

*Primary Examiner*—Charles T. Jordan
*Assistant Examiner*—John R. Hardee
*Attorney, Agent, or Firm*—Dvorak and Traub

[57] ABSTRACT

The invention relates to a method of preparing hydrazine nitroform (HNF) by dissolving nitroform of a purity of more than 98.5 wt % in a solvent and reacting it with hydrazine in the presence of a small amount of proton-transferring medium.

21 Claims, No Drawings

METHOD OF PREPARING HYDRAZINE NITROFORM

This invention relates to a method of preparing hydrazine nitroform and more particularly to a method of preparing hydrazine nitroform in a pure and stable form which renders the hydrazine nitroform suitable in particular as a solid propellant.

High-energy solid oxygen oxidizers that are suitable for use as propellant have long been searched for. Suitable compounds should possess a high density, be thermally stable and exhibit high impact resistance, both alone and in mixtures with other compounds.

In the 1960s it was already found that hydrazine nitroform (HNF), alternatively referred to as hydrazine nitroformate or hydrazine nitroformiate, is a very strong oxidizer which renders this compound useful as fuel. The compound has a high energetic value, so that it is particularly suitable as a solid propellant.

It has been found that this compound, contrary to the suggestion of the structural formula $NH_2NH_2 \cdot HC(NO_2)_3$, is thermally stable. Indeed, most nitroform compounds decompose rapidly at room temperature or even below room temperature.

The compound is relatively impact resistant and, even when mixed with aluminum, no reduction of the impact resistance arises. This is of importance because hydrazine nitroform, as described in U.S. Pat. No. 3,307,985, is often mixed with aluminum, among others, to improve the properties regarding its performance as a solid propellant. Aluminum, but also magnesium, beryllium or other metals, is then employed as powdery fuel compound.

Methods of preparing hydrazine nitroform have long been known. U.S. Pat. No. 3,297,747 describes a method of preparing hydrazine nitroform through dissolving nitroform in alcohol and slowly, dropwise adding hydrazine thereto. The hydrazine nitroform formed then precipitates as a salt. This salt can be isolated by means of filtration and optionally be further purified by recrystallization from a solution in a short chain alcohol, such as isopropyl alcohol. The yield of hydrazine nitroform achieved by means of this method is 50%.

Such a method is also described in U.S. Pat. No. 3,378,594, where equimolar amounts of hydrazine (hydrated or non-hydrated) are mixed with nitroform at 0° C. to 50° C. and atmospheric pressure. Water can be present as solvent and is then present in large amounts. Preferably, however, the method is effected in the presence of an organic solvent such as methanol.

In the Encyclopedia of Explosives and Related Items, S. M. Kaye, vol 8, page M78-M80 (1978) a method for preparing HNF is described, in which hydrazine is mixed with nitroform in water. The end product can also be prepared by adding anhydrous hydrazine to nitroform in isopropyl alcohol.

However, as appears from numerous publications from the 1960s and 1970s, the hydrazine nitroform produced in this way did not exhibit the desired stability. As described in U.S. Pat. No. 3,418,183, the hydrazine nitroform tends to form bubbles, or, as it is called, the hydrazine nitroform 'gasses'. This tendency to 'gas' is attributed to impurities of the hydrazine nitroform produced. It appears from U.S. Pat. No. 3,378,595 that the stability of the hydrazine nitroform depends on the ratio of the hydrazine to the nitroform and on the purity of nitroform and solvent.

One possibility of preventing hydrazine nitroform from 'gassing' could be to purify the hydrazine nitroform. However, this option is laborious and hence expensive.

Accordingly, to sufficiently ensure stability, it proved necessary to always add stabilizers. A great deal of research was focused on finding a stabilizer which, in small amounts, is capable of stabilizing the hydrazine nitroform to a sufficient degree.

Publications which can be mentioned in this connection include the above-mentioned U.S. Pat. No. 3,418,183, where anhydrides of dicarboxylic acids are proposed, U.S. Pat. No. 3,658,608, where nitroguanidine is proposed, and U.S. Pat. No. 3,384,674, disclosing the addition of non-volatile aldehyde compounds such as benzaldehyde for increasing the stability of hydrazine nitroform.

U.S. Pat. No. 3,384,675 discloses the stabilization of nitroform salts with salts of (in)organic acids. However, a drawback of such addition is that if, for instance, mercurous oxalate is used, this compound only regulates the high impact sensitivity.

From the large number of publications about possibly suitable stabilizers, it appears that finding a stabilizer that is useful in all respects presents major problems.

A drawback of the use of stabilizers in general, incidentally, is that they reduce a part of the weight of the fuel to useless mass because they do not contribute to the supply of energy.

Accordingly, it has long been attempted to find a method which makes it possible to prepare hydrazine nitroform of such purity that the use of stabilizers could be reduced or even rendered superfluous.

An initiative to that effect was the marketing of 'High Purity Grade' hydrazine (HPG hydrazine). This is hydrazine with a purity of at least 99.0% and a maximum water content of 1.0 wt. %. The hydrazine hitherto used was Standard Grade hydrazine with a purity of 98% and a maximum water content of 1.5%.

The expectation was that if a purer starting product was used, the end product would also possess a higher purity.

However, after tests with this HPG hydrazine, in which hydrazine nitroform was prepared in conventional manner with nitroform in an anhydrous reaction medium, it appeared that the hydrazine nitroform obtained was only as pure as, or even less pure than, the product prepared with Standard Grade hydrazine.

Thus, the use of HPG hydrazine did not initially seem to lead to the desired increased purity of the product.

Surprisingly, it has now been found that it is possible to obtain hydrazine nitroform with a very high purity and yield, starting from HPG hydrazine.

It has in fact been found that a small amount of proton-transferring medium dispersed in the reaction medium catalyzes the salt formation, whereby at the same time a purer end product is formed.

Both water and lower ($C_1$-$C_6$) alcohols are suitable as proton-transferring media.

Of the lower alcohols, methanol and isopropanol are preferred, but other $C_1$-$C_6$ alcohols can be used as well.

This new method enables the production of hydrazine nitroform of so high a purity that it is no longer necessary to use any stabilizer at all, since the lack of stability was found to be caused by the presence of impurities.

The yield of hydrazine nitroform prepared by this new method is greater than the yield obtained by the known methods and the process as a whole accordingly leads to a major saving in cost.

In the preparation according to the present invention, nitroform (NF, melting point 22.0° C.) is mixed with an organic solvent. This nitroform starting material should preferably be of at least 98.5% purity, with water being considered an impurity.

For reasons of safety, the nitroform is mostly supplied as aqueous solution, for instance in a 32% aqueous solution.

In that case, the nitroform can be used by extracting it from the aqueous solution by means of dichloroethane.

The nitroform can also be utilized by salting it out from the solution by means of, for instance, NaCl, KCl, $NANO_3$ or other salts suitable therefor. NaCl is preferred here.

In salting out, a two-phase system is formed, comprising a water layer and a nitroform layer. The nitroform layer is separated from the salt-containing water layer and also the residual water is removed from the nitroform layer to ensure that salts and other impurities present in the water will be present in the end product to the least possible extent.

In particular the presence of chlorine ions in the residual water is undesirable, since their presence leads to the end product exhibiting increased chlorine emission upon combustion, which is undesirable on account of the additional environmental pollution involved. Further, the presence of chlorine ions can give rise to a reduction of the stability.

An amount not exceeding 0.05 wt. % chlorine relative to the amount of HNF can still be regarded as acceptable.

The method according to the invention is preferably carried out in a solvent that, on the one hand, is a dissolvent medium for the nitroform and, on the other, is a nonsolvent for the hydrazine nitroform to be formed. In addition, it functions as 'heat sink' for the reaction to absorb a part of the reaction heat). Suitable solvents include, among others, organic solvents as dichloroethane (DCE) and dichloromethane (DCM). Dichloroethane is preferred. The ratio of nitroform to solvent is preferably between 3:1 and 1:9, preferably between 1:2 and 1:3 and is for instance 1:2.5. Preferably, sufficient solvent will be present to dissipate the heat produced in the reaction.

To the mixture of nitroform and solvent a small amount of water or $C_1$-$C_6$ alcohol is then added, 'small amount' meaning more than 0.5 vol. %, preferably 0.5–20 vol. %, more preferably 1–10 vol. % and most preferably 2.5–7 vol. %, calculated on the amount of solvent.

The mixture is then cooled and hydrazine is added dropwise, with the temperature of the reaction system remaining preferably under 5° C. Generally, this temperature will be between −5° C. and +5° C. After the hydrazine has been added, preferably stirring is continued for a period of time at a temperature of approximately 0° C. (i.e. between −10° C. and +5° C). This period of time is generally between 5 and 240 min.

The amounts of nitroform and hydrazine used are generally between 0.9 and 1.1 on a molar basis, but the amounts are preferably equimolar. The requisite amount of hydrazine is determined on the basis of the amount of nitroform initially present. If desired, a separate determination can take place, for instance by means of a titrimetric determination of the amount of nitroform.

After stirring, the crude HNF is removed from the reactor, the supernatant liquid is decanted and the wet product is dried.

Optionally, the crude product thus obtained can be purified by means of recrystallization, for instance as described in U.S. Pat. No. 3,297,747, utilizing isopropyl alcohol. This recrystallization can generally be carried out from a solution in a short chain alcohol.

Recrystallization can also be carried out by preparing a solution of the coarse HNF which is subsequently poured out in a nonsolvent. Suitable media for this purpose are methanol as solvent and methylene chloride as nonsolvent.

The present invention will be further explained in and by the following examples.

In these examples, for reasons of safety, a stock solution of nitroform is employed, but the nitroform can naturally be used in undiluted form as well.

PREPARATION OF HYDRAZINE NITROFORM

EXAMPLE 1

1000 ml of a stock solution of a 32% (w/w) nitroform (NF) in water is introduced into a glass 2-liter vat, provided with a glass stirrer, without any metal parts being present in order to prevent catalytic decomposition of hydrazine or compounds thereof. Then at room temperature 216 g NaCl is added with stirring, whereby the nitroform is displaced from the water layer by the NaCl. A two-phase system forms, with the liquid nitroform separating from the NaCl-saturated water layer.

After separation with the aid of a separating funnel, 500 ml dichloroethane (DCE) is added to the nitroform layer and this mixture is again introduced into a clean separating funnel. Again a small amount of water separates, which is also removed.

The NF/DCE mixture is introduced into a reactor, 30 ml water is added to the reaction mixture (6 vol. % relative to the amount of solvent) and the mixture is cooled to 0° C. With continuous stirring, an equimolar amount of HPG hydrazine is added to the solution in dropwise manner. The rate of addition is set such that the temperature in the reaction vat remains between 0° and 5° C. After all of the hydrazine has been added, stirring is continued for another 60 minutes to ensure that the reaction has proceeded to completion.

Then the coarse HNF is taken from the reactor, the DCE is removed by means of decanting and the coarse material is dried for 48 hours in a vacuum dry oven at 30° C. under vacuum.

The yield of the coarse product is approx. 100%, based on hydrazine.

The coarse HNF, after being dried, appears to have a melting point of 115° C.

The coarse product is purified by means of recrystallization, a solution being made in methanol, which solution is subsequently poured out in methylene chloride. The end product then precipitates.

The end product has a melting point of 120° C.

COMPARATIVE EXAMPLE 1

Hydrazine nitroform is prepared by the method described in Example 1, starting from High Purity Grade hydrazine. However, no water is added during the preparation.

The product obtained, after being dried, has a melting range of 58°–70° C.

COMPARATIVE EXAMPLE 2

Hydrazine nitroform is prepared by the method described in Example 1, starting, however, from Standard Grade hydrazine without addition of water. A product is obtained which, after drying, has a melting range of 60°–80° C.

The results of the examples are summarized in the table below.

TABLE

| Starting material + treatment | melting point/ melting range (°C.)* |
|---|---|
| High purity grade hydrazine + 6% added water** | 115 |
| High purity grade hydrazine + 6% added water + recrystallization | 120 |
| High purity grade hydrazine, without added water*** | 58–70 |
| Standard Grade hydrazine, without added water**** | 60–80 |

*the pure salt decomposes at 123° C.
**relative to the amount of solvent.
***HPG hydrazine contains up to 1% water.
****Standard Grade hydrazine contains up to 1.5% water.

From this table it clearly appears that the best results are obtained if High Purity Grade hydrazine is employed in the presence of a small amount of water.

If the known techniques are employed, such as for instance in Comparative example 2, then the hydrazine nitroform obtained is considerably less pure than the hydrazine prepared by the method according to the present invention.

We claim:

1. A method of preparing hydrazine nitroform (HNF) by dissolving nitroform of a purity of more than 98.5 wt. % in a medium that is a solvent for the nitroform and is a nonsolvent for the hydrazine nitroform to be formed, and reacting the nitroform with hydrazine of a purity of more than 99.0 wt. % in the presence of a small amount of proton-transferring medium.

2. A method according to claim 1, wherein the proton-transferring medium is one of water and a lower ($C_1$-$C_6$) alcohol.

3. A method according to claim 2, wherein the lower ($C_1$-$C_6$) alcohol is one of methanol and isopropanol.

4. A method according to claim 1, wherein the solvent is an organic solvent.

5. A method according to claim 1, wherein the amount of proton-transferring medium is greater than 0.5 vol. %, based on the amount of solvent.

6. A method according to claim 1, wherein the nitroform to solvent ratio is between 3:1 and 1:9.

7. A method according to claim 1, wherein the hydrazine used is High Purity Grade hydrazine.

8. A method according to claim 1, wherein the hydrazine to nitroform ratio is approximately stoichiometric.

9. A method according to claim 1, wherein the mixture of nitroform and solvent, prior to the addition of the pure hydrazine, is cooled to a temperature below approximately 5° C.

10. A method according to claim 1, wherein as source for the nitroform an aqueous solution of nitroform is used.

11. A method according to claim 10, wherein the nitroform is extracted from the aqueous solution by means of dichloroethane.

12. A method according to claim 10, wherein the nitroform is salted out from the aqueous solution by means of a salt, whereby the liquid nitroform separates from the salt-saturated water layer, which layers are separated from each other.

13. A method according to claim 12, wherein the salting-out step is carried out with NaCl.

14. A method according to claim 1, wherein the hydrazine nitroform obtained is purified by means of recrystallization.

15. A method according to claim 4, wherein the organic solvent is one of dichloroethane and dichloromethane.

16. A method according to claim 15, wherein the organic solvent is dichloroethane.

17. A method according to claim 5, wherein the amount of proton-transferring medium is between 0.5 and 20 vol. %, based on the amount of solvent.

18. A method according to claim 17, wherein the amount of proton-transferring medium is between 1 and 10 vol. %, based on the amount of solvent.

19. A method according to claim 18, wherein the amount of proton-transferring medium is between 2.5 and 7 vol. %, based on the amount of solvent.

20. A method according to claim 6, wherein the nitroform to solvent ratio is between 1:2 and 1:3.

21. A method according to claim 9, wherein the mixture of nitroform and solvent, prior to the addition of the pure hydrazine, is cooled to approximately 0° C.

* * * * *